(12) United States Patent
Kawabe et al.

(10) Patent No.: US 10,072,171 B2
(45) Date of Patent: Sep. 11, 2018

(54) OLEFIN-BASED PAINT CONTAINING PROPYLENE/α-OLEFIN COPOLYMER

(71) Applicant: Mitsui Chemicals, Inc., Tokyo (JP)

(72) Inventors: Kuniaki Kawabe, Chiba (JP);
Hirotaka Kanaya, Chiba (JP);
Masakazu Tanaka, Yokohama (JP);
Toshiyuki Ito, Ichihara (JP)

(73) Assignee: MITSUI CHEMICALS, INC., Tokyo (JP)

(*) Notice: Subject to any disclaimer, the term of this patent is extended or adjusted under 35 U.S.C. 154(b) by 3 days.

(21) Appl. No.: 14/896,059

(22) PCT Filed: Jun. 6, 2014

(86) PCT No.: PCT/JP2014/003018
§ 371 (c)(1),
(2) Date: Dec. 4, 2015

(87) PCT Pub. No.: WO2014/196206
PCT Pub. Date: Dec. 11, 2014

(65) Prior Publication Data
US 2016/0115334 A1 Apr. 28, 2016

(30) Foreign Application Priority Data

Jun. 7, 2013 (JP) ................................ 2013-121207

(51) Int. Cl.
*C09D 123/14* (2006.01)
(52) U.S. Cl.
CPC ....... *C09D 123/14* (2013.01); *C09D 123/142* (2013.01)
(58) Field of Classification Search
CPC ...... C09D 123/14; C09D 123/142; C08F 8/50
USPC ......................................... 524/570
See application file for complete search history.

(56) References Cited

U.S. PATENT DOCUMENTS

| | | | |
|---|---|---|---|
| 4,299,754 A | 11/1981 | Shiomi et al. | |
| 4,892,851 A | 1/1990 | Ewen et al. | |
| 4,952,649 A | 8/1990 | Kioka et al. | |
| 4,971,937 A | 11/1990 | Albizzati et al. | |
| 5,036,034 A | 7/1991 | Ewen | |
| 5,081,322 A | 1/1992 | Winter et al. | |
| 5,334,677 A | 8/1994 | Razavi et al. | |
| 5,539,067 A | 7/1996 | Parodi et al. | |
| 5,618,771 A | 4/1997 | Parodi et al. | |
| 6,194,342 B1 | 2/2001 | Parodi et al. | |
| 6,369,175 B1 | 4/2002 | Ewen | |
| 6,515,085 B1 | 2/2003 | Parodi et al. | |
| 6,939,928 B1 | 9/2005 | Kawai et al. | |
| 9,606,465 B2 * | 3/2017 | Kawabe | G03G 9/0904 |
| 2003/0055179 A1 | 3/2003 | Ota et al. | |
| 2005/0228155 A1 | 10/2005 | Kawai et al. | |
| 2006/0276607 A1 | 12/2006 | Ikenaga et al. | |
| 2008/0292896 A1 | 11/2008 | Ikenaga et al. | |
| 2008/0306219 A1 | 12/2008 | Ikenaga et al. | |
| 2008/0306234 A1 | 12/2008 | Ikenaga et al. | |
| 2008/0312461 A1 | 12/2008 | Ikenaga et al. | |
| 2009/0043050 A1 | 2/2009 | Ikenaga et al. | |
| 2009/0162679 A1 | 6/2009 | Asami et al. | |
| 2011/0196103 A1 | 8/2011 | Kawahara et al. | |
| 2013/0157051 A1 | 6/2013 | Nagano et al. | |
| 2013/0266806 A1 | 10/2013 | Nagano et al. | |

FOREIGN PATENT DOCUMENTS

| | | |
|---|---|---|
| CN | 101351513 A | 1/2009 |
| CN | 102971374 A | 3/2013 |
| JP | S57-63310 A | 4/1982 |
| JP | 58-83006 A | 5/1983 |
| JP | 62-21027 B2 | 5/1987 |
| JP | 2-41303 A | 2/1990 |
| JP | 3-706 A | 1/1991 |
| JP | 3-193796 A | 8/1991 |
| JP | H03-197516 A | 8/1991 |
| JP | 4-218508 A | 8/1992 |
| JP | H08-100032 A | 4/1996 |
| JP | 2000-345098 A | 12/2000 |
| JP | 2003-345098 A | 12/2000 |
| JP | 2003-105022 A | 4/2003 |
| JP | 3476793 B2 | 12/2003 |
| JP | 2005-194507 A | 7/2005 |
| JP | 2007-291383 A | 11/2007 |
| JP | 2009-013365 A | 1/2009 |
| JP | 2009-114314 A | 5/2009 |
| JP | 2009-114316 A | 5/2009 |
| JP | 2009-114319 A | 5/2009 |
| JP | 2009114314 A * | 5/2009 |
| JP | 2009114316 A * | 5/2009 |
| JP | 2012-144692 | 8/2012 |
| WO | WO 01/27124 A1 | 4/2001 |
| WO | WO 01/53369 A1 | 7/2001 |
| WO | WO 2004/08775 A1 | 10/2004 |
| WO | WO 2004/087775 A1 | 10/2004 |

* cited by examiner

*Primary Examiner* — Kelechi C Egwim
(74) *Attorney, Agent, or Firm* — Foley & Lardner LLP

(57) ABSTRACT

The present invention relates to an olefin-based paint. The purpose of the present invention is to provide a paint with excellent organic solvent solubility or dispersibility, low paint viscosity, minimal coating irregularities even at high concentrations, excellent handling and storage stability, and excellent blocking resistance and coated film stability. In order to meet this purpose, an olefin-based paint is used that is characterized by containing a solution or dispersion obtained by dissolving or dispersing 0.1-55 parts by mass of a propylene-α-olefin copolymer (A) for 100 parts by mass of an organic solvent. The copolymer (A) is characterized by containing 60-90 mol % of propylene-derived constituent units (a) having a weight-average molecular weight (Mw), measured by GPC, in the range of 3,000 to 40,000, and 10-40 mol % of α-olefin-derived constituent units (b) having 4 or more carbon atoms [wherein (a)+(b)=100 mol %].

10 Claims, No Drawings

OLEFIN-BASED PAINT CONTAINING PROPYLENE/α-OLEFIN COPOLYMER

TECHNICAL FIELD

The present invention relates to an olefin-based coating material which includes an olefin polymer having excellent solubility or dispersibility in an organic solvent. The olefin-based coating material according to the present invention has low viscosity and leaves less coating unevenness even in high concentration. Furthermore, the coating material is excellent in handling and preservation stability, and enables a coating film having excellent blocking resistance and stability.

BACKGROUND ART

In the past, materials such as plastic, metal, paper, wood, fiber, leather, glass, rubber, ceramic, concrete and asphalt have been used in a variety of industrial products. Most of the industrial products are comprised of composite materials, which are obtained by combining more than two different materials. The use of composite materials enables high functionalization and cost reduction. The coating materials for such composite materials require coating property and adhesiveness to different materials.

In response to such demand, coating materials that include propylene polymer which is graft-modified using maleic anhydride with enhanced adhesiveness to polyolefin-based molded articles (Patent Literature (hereinafter, referred to as "PTL") 1), and coating materials with improved coating property that include a polymer obtained by chlorinating an acid-modified propylene polymer and reacting the chlorinated acid-modified propylene polymer with an epoxy compound (PTL 2), have been manufactured.

However, the above-mentioned coating materials required processes, such as, heating above the melting point of a resin during coating process, which resin is included in the coating material, and drying the coating film for a long time for stabilization. Hence, further improvements are being required for such coating materials.

Meanwhile, it is also required to make the drying process efficient; that is to say, increasing the concentration of resin within the coating material for the purpose of reducing the time taken for drying and the related energy cost. However, there have been cases wherein higher resin concentrations increase the viscosity and lower handling property of the coating material. In other cases, misting, streak and unevenness appeared during the coating process, or preservation stability of coating material is undermined. In this regard, the enhancement of solubility of resin in solvent to solve the above-mentioned problems is being studied. For example, a coating material is disclosed of which propylene elastomer, which is graft-modified with a polar monomer, is dissolved or dispersed in an organic solvent (PTL 3).

CITATION LIST

Patent Literature

PTL 1
Japanese Examined Patent Application Publication No. 62-21027
PTL 2
Japanese Patent Application Laid-Open No. 08-100032
PTL 3
Japanese Patent Application Laid-Open No. 2000-345098

SUMMARY OF INVENTION

Technical Problem

However, the coating material and the like disclosed in PTL 3 have the problems of requiring too much heat and time for dissolution or dispersion of a resin in an organic solvent, and of complicated production process. Also, an olefin-based coating material with high resin concentration in coating material, and an olefin-based coating material with less coating unevenness, excellent in handling and preservation stability and which enables a coating film having excellent blocking resistance and stability have been in demand more than ever.

The present invention is created in consideration of the above-mentioned problems pertinent in the art. An object of the present invention is to produce a coating material in which olefin resin is dissolved or dispersed in an organic solvent, which is free from separation of a component or coating unevenness, and enables a coating film having good blocking resistance.

Solution to Problem

After studying the above-described problems, the inventors of the present invention completed the invention by establishing that: an olefin resin of a specific structure showed high solubility or dispersibility in an organic solvent; a coating material which includes such an olefin resin was quick in hardening; the resin concentration can be increased in such a coating material; the compatibility of each component was superior even when other resin was included in the coating material, and showed less component separation and coating unevenness; and a coating film obtained from the coating material showed high blocking resistance and stability.

The olefin-based coating material of the invention includes a solution or dispersion in which 0.1 to 55 parts by mass of a propylene-α-olefin copolymer (A), which satisfies the following requirements, is dissolved or dispersed in 100 parts by mass of an organic solvent.

The propylene-α-olefin copolymer (A) included in the olefin-based coating material of the present invention has the following characteristics:

(i) a weight-average molecular weight (Mw) measured by GPC in the range of 3,000 to 40,000; and (ii) the propylene-α-olefin copolymer (A) contains propylene-derived structural units (a) in the range of 60 to 90 mol %, and structural units (b) derived from α-olefin having more than 4 carbon atoms in the range of 10 to 40 mol % (wherein (a)+(b)=100 mol %).

Furthermore, the propylene-α-olefin copolymer (A) included in the olefin-based coating material of the present invention has the following characteristics:

(iii) the number of vinylidene groups per 1,000 carbon atoms measured by $^1$H-NMR is 0.5 to 5.

The propylene-α-olefin copolymer of the invention also has the following characteristics:

(iv) a half-width of crystal melting peak obtained from differential scanning calorimetry (DSC) in the range of 1 to 20° C.; and (v) the melting point (Tm) obtained from DSC is in the range of 60 to 110° C.

The propylene-α-olefin copolymer (A) included in the olefin-based coating material of the present invention also has the following characteristics:

(vi) the heat of fusion (ΔH) obtained from DSC is in the range of 40 to 100 J/g.

The propylene-α-olefin copolymer (A) included in the olefin-based coating material of the invention is produced through thermal decomposition of a propylene-α-olefin copolymer (A-1) which satisfies the following requirements (a) to (c):

(a) a weight-average molecular weight (Mw) measured by GPC is in the range of 50,000 to 1,000,000;
(b) a melting point (Tm) obtained from DSC is in the range of 60 to 120° C.; and
(c) a half-width of the melting peak obtained from DSC is in the range of 1 to 20° C.

The propylene-α-olefin copolymer (A) included in the olefin-based coating material of the present invention is characterized by a complete dissolution in the above-mentioned organic solvent at 50° C. or above.

The propylene-α-olefin copolymer (A) included in the olefin-based coating material of the present invention has a 60 rotational viscosity at 23° C., measured by B-type viscometer, of equal to or less than 500 mPa-s when the concentration of the propylene-α-olefin copolymer (A) is 10 mass %.

The organic solvent used for the olefin-based coating material of the present invention is preferably at least one organic solvent selected from a hydrocarbon solvent, an alcohol solvent and an ester solvent.

The SP value of the organic solvent used in the invention is preferably in the range of 7.0 to 13.0.

The olefin-based coating material of the invention is obtained by dissolving or dispersing the propylene-α-olefin copolymer (A) in the organic solvent.

The second olefin-based coating material of the present invention includes a solution or dispersion of propylene-α-olefin copolymer (A) and other resin (B) dissolved or dispersed in an organic solvent, the propylene-α-olefin copolymer (A) satisfying the following conditions (i) and (ii).

The propylene-α-olefin copolymer (A) of the invention has the following characteristics:
(i) the weight-average molecular weight (mw) measured by GPC is in the range of 3,000 to 40,000; and
(ii) the propylene-α-olefin copolymer (A) contains propylene-derived structural units (a) in the range of 60 to 90 mol %, and structural units (b) derived from α-olefin having no less than 4 carbon atoms in the range of 10 to 40 mol % (wherein (a)+(b)=100 mol %).

Also, the propylene-α-olefin copolymer (A) included in the second olefin-based coating material of the invention has the following characteristics:
(iii) the number of vinylidene groups per 1,000 carbon atoms measured by $^1$H-NMR is 0.5 to 5.

The propylene-α-olefin copolymer included in the second inventive olefin-based coating material also has the following characteristics:
(iv) the half-width of crystal melting peak obtained from differential scanning calorimetry (DSC) in the range of 1 to 20° C.; and
(v) the melting point (Tm) obtained from DSC in the range of 60 to 110° C.

The propylene-α-olefin copolymer (A) included in the second olefin-based coating material also has the following characteristics:
(vi) the heat of fusion (ΔH) obtained from DSC is in the range of 40 to 100 J/g.

Advantageous Effects of Invention

The olefin-based coating material of the present invention includes a specific olefin resin, which is highly soluble or dispersible in an organic solvent. Thus, the olefin-based coating material of the invention is not likely to experience separation of components and is free from to coating unevenness. The blocking resistance of coating films obtained by application of the coating material is high. Also, the separation of components hardly occurs even when other resins are included in the olefin-based coating material. The rate at which the olefin-based coating material hardens when applied is also high.

DESCRIPTION OF EMBODIMENTS

<Olefin-Based Coating Material>

The olefin-based coating material of the invention comes in two forms. The first olefin-based coating material includes a solution or dispersion of the propylene-α-olefin copolymer (A) dissolved or dispersed in the organic solvent. The second olefin-based coating material includes a solution or dispersion of the propylene-α-olefin copolymer (A) and other resin (B) dissolved or dispersed in the organic solvent. Unless otherwise mentioned, the propylene-α-olefin copolymer (A), the organic solvent and a propylene-α-olefin copolymer (A-1) of high molecular weight for obtaining the propylene-α-olefin copolymer (A), which are included in the first and the second olefin-based coating materials, are the same.

1. Propylene-α-Olefin Copolymer (A)
(i) Weight-Average Molecular Weight (Mw)

The propylene-α-olefin copolymer (A) included in the olefin-based coating material of the present invention has a weight-average molecular weight (Mw) measured with GPC in the range of 3,000 to 40,000. The upper limit of the weight-average molecular weight (Mw) is preferably 30,000, more preferably 20,000, and particularly preferably 10,000. Meanwhile, the lower limit of the weight-average molecular weight (Mw) is preferably 5,000, more preferably 6,000, and particularly preferably 7,000. The weight-average molecular weights (Mw) described above are expressed in terms of polypropylene.

The weight-average molecular weight (Mw) of the propylene-α-olefin copolymer (A) in the above range facilitates the handling of the olefin-based coating material. Moreover, coating films obtained by the application of the coating material tend to be uniform, and the blocking resistance of the coating films and adhesiveness between the coating films and base materials are likely to be superior. When the weight-average molecular weight (Mw) is below the above-mentioned upper limit, the solubility or dispersibility of the propylene-α-olefin copolymer (A) in the organic solvent or in other resins included in the olefin-based coating materials increases, and thus, the viscosity of the olefin-based coating material is easily maintained in a moderate range. As a result, it is possible to increase the concentration of the propylene-α-olefin copolymer (A) within the olefin-based coating material, thereby enhancing the handling of the olefin-based coating material. Also, for the same reason, streaks or unevenness are not likely to appear on coating films, and coating films that are even can be obtained.

Although specific reasons are unclear, when the weight-average molecular weight (Mw) is below the upper limit described above, the propylene-α-olefin copolymer (A) is easily crystallized and the hardening speed in the drying process is accelerated. Consequently, the blocking resistance of a coating film is enhanced. Also, when the weight-average molecular weight (Mw) is lower than the upper limit, a coating film tends to follow the base material easily, the contractibility of the coating film is controlled, and the adhesiveness of the coating film to the base material increases.

Meanwhile, when the weight-average molecular weight (Mw) is above the above-mentioned lower limit, stickiness due to lower molecular weight components is controlled, and the blocking resistance of a coating film is easily enhanced. In general, the olefin of the propylene-α-olefin copolymer (A) of relatively low molecular weight contains a large amount of sticky component, and thus, has been deemed difficult to be handled as a coating film. However, keeping the weight-average molecular weight (Mw) in the range described enables a coating film with excellent blocking resistance to be obtained.

Here, Mw (weight-average molecular weight)/Mn (number-average molecular weight) of the propylene-α-olefin copolymer (A), which is measured by GPC, is not particularly limited, and is generally in the range of 1 to 5, and preferably, 2 to 4. When Mw/Mn is within the range, the balance among the stability of the olefin-based coating material, a coating film's blocking resistance and the adhesiveness to base materials are excellent. Meanwhile, blocking resistance tends to be excellent when Mw/Mn is in the range of 1.1 to 3.0, and preferably 2.0 to 3.0. Also, when Mw/Mn is higher than 3.0, preferably 3.1 to 5.0, and more preferably 3.1 to 4.0, the affinity between other resins or additives included in the olefin-based coating material and the propylene-α-olefin copolymer (A) increases, and the stability of the coating material is improved. Also, the adhesiveness between the obtained coating film and the base materials tends to become improved.

(ii) Structural Components of the Propylene-α-Olefin Copolymer (A)

The propylene-α-olefin copolymer (A) included in the olefin-based coating material of the present invention contains propylene-derived structural units (a) in the amount of 60 to 90 mol %, and structural units (b) derived from α-olefin having not less than 4 carbon atoms in the amount of 10 to 40 mol %. Here, the sum of (a) and (b) equals 100 mol %.

The amount of propylene-derived structural units (a) in the propylene-α-olefin copolymer (A) is preferably 65 to 88 mol %, more preferably 70 to 85 mol %, and even more preferably 75 to 82 mol %. Thus, the upper limit of propylene-derived structural units (a) is 90 mol %, preferably 88 mol %, even more preferably 85 mol %, and even more preferably 82 mol %. Meanwhile, the lower limit of propylene-derived structural units (a) is 60 mol %, preferably 65 mol %, more preferably 70 mol %, and even more preferably 75 mol %.

The content of structural units (b) derived from α-olefin having 4 or more carbon atoms is preferably in the range of 12 to 35 mol %, more preferably 15 to 30 mol %, and even more preferably 18 to 25 mol %. Thus, the upper limit of structural units (b) derived from α-olefin having 4 or more carbon atoms is 35 mol %, more preferably 30 mol %, and even more preferably 25 mol %. Meanwhile, the lower limit of structural units (b) derived from α-olefin having 4 or more carbon atoms is 10 mol %, preferably 12 mol %, more preferably 15 mol %, and even more preferably 18 mol %.

Examples of the α-olefins having 4 or more carbon atoms, which are contained in the propylene-α-olefin copolymer (A), include 1-butene, 1-hexene, 4-methyl-1-pentene, 1-octene, and 1-decene. The α-olefins having 4 or more carbon atoms are preferably α-olefins having 4 to 10 carbon atoms, more preferably α-olefins having 4 to 8 carbon atoms, and particularly preferably 1-butene.

The propylene-α-olefin copolymer (A) may contain propylene and olefin-derived structural units other than α-olefins having 4 or more carbon atoms in a small amount of, for example, less than 10 mol % in the total content (mol) of the structural units of the propylene-α-olefin copolymer (A). An example of olefins other than α-olefin is ethylene. However, from the perspective of solubility or dispersibility of the olefin-based coating material and blocking resistance of coating films of the olefin-based coating material, it is preferable not to include ethylene-derived structural units.

Also, the propylene-α-olefin copolymer (A) may contain olefin polymerizable monomers other than α-olefins. Examples of structural units derived from olefin polymerizable monomers other than α-olefins include structural units derived from various olefin polymerizable monomers including vinyl acetate; unsaturated carboxylic acids such as acrylic acid and methacrylic acid; unsaturated carboxylates such as methyl acrylate, ethyl acrylate, isobutyl acrylate, n-butyl acrylate, 2-ethyl hexyl acrylate, methyl methacrylate and glycidyl methacrylate; and styrene. The amount of the structural units derived from olefin polymerizable monomers other than α-olefins is preferably 10 parts by mole or less, relative to 100 parts by mole of the total of the propylene-derived structural units (a) and the structural units (b) derived from α-olefins having 4 or more carbon atoms described above (i.e., (a)+(b)). However, they are preferably excluded from the perspective of increasing the hardness of the propylene-α-olefin copolymer (A).

(iii) The Content of Unsaturated Terminal (Vinylidene) Groups

The content of unsaturated terminal (vinylidene) groups of the propylene-α-olefin copolymer (A) is not particularly limited, but the upper limit for terminal vinylidene group per 1,000 carbon atoms measured by $^1$H-NMR is preferably 5/1,000 carbons, more preferably 4/1,000 carbons, and particularly preferably 3.5/1,000 carbons. The lower limit for terminal vinylidene group is preferably 0.5/1,000 carbons, more preferably 1/1,000 carbons, and particularly preferably 2/1,000 carbons.

If the number of the unsaturated terminal (vinylidene) groups is in the above-described range, for example, the affinity between other resins or additives included in the olefin-based coating material and the propylene-α-olefin copolymer (A) increases, and the stability of the coating material is improved. The adhesiveness between the obtained coating film and the base materials also improves.

The propylene-α-olefin copolymer (A) of which the content of the unsaturated terminal (vinylidene) groups is within the above-mentioned range is, for instance, produced by the method including a thermal decomposition process mentioned hereunder. With this method, the thermal decomposition ratio (Mw before thermal decomposition/Mw after thermal decomposition) is controlled, thereby adjusting the content of the unsaturated terminal (vinylidene) groups. The higher the thermal decomposition ratio, the more the number of the vinylidene groups.

(iv) Half-Width of the Peak Melting Point, (v) the Melting Point, and (vi) the Heat of Fusion The melting point (Tm) of the propylene-α-olefin copolymer (A) obtained from DSC is preferably in the range of 60 to 110° C., more preferably 60 to 90° C., even more preferably 65 to 85° C., and particularly preferably 70 to 80° C. Thus, the upper limit of the melting point (Tm) is preferably 110° C., more preferably 95° C., even more preferably 85° C., and particularly preferably 80° C. Meanwhile, the lower limit of the melting point (Tm) is preferably 60° C., more preferably 65° C., and particularly preferably 70° C.

When the melting point (Tm) of the propylene-α-olefin copolymer (A) is within the range mentioned above, the balance among the solubility or dispersibility of the propylene-α-olefin copolymer (A) in the organic solvent and other resins, the blocking resistance of a coating film obtained by applying the coating material and the adhesiveness between the coating film and base materials become excellent.

Meanwhile, the half-width of the peak melting point obtained from DSC is preferably in the range of 1 to 20° C., more preferably 5 to 20° C., even more preferably 7 to 20° C., and particularly preferably 10 to 15° C.

When the half-width of the peak melting point of the propylene-α-olefin copolymer (A) obtained from DSC is within the above-mentioned range, the balance among the solubility or dispersibility of the propylene-α-olefin copolymer (A) in the organic solvent and other resins, the blocking resistance of a coating film obtained by applying the coating material and the adhesiveness between the coating film and base materials tend to be excellent.

Here, when the half-width of the peak melting point of the propylene-α-olefin copolymer (A) obtained from DSC is within the above-described range, the distribution of α-olefins seems to be uniform. On the other hand, the propylene-α-olefin copolymer (A) of which the half-width exceeds the upper limit, it seems that there are parts where α-olefins are dense or loose. Also, there are instances in which parts where α-olefins are placed densely cause stickiness and undermine the blocking resistance of a coating film. Also, the propylene-α-olefin copolymer (A) of which the half-width is below the above-mentioned lower limit has a narrower composition distribution, and the compatibility with resins or fillers included in the olefin-based coating material is not necessarily good, and the solubility or dispersibility in these materials is deemed to be lower.

The heat of fusion (ΔH) of the propylene-α-olefin copolymer (A) obtained from DSC is preferably in the range of 40 to 100 J/g, more preferably 45 to 80 J/g, even more preferably 45 to 70 J/g, and particularly preferably 45 to 60 J/g.

When the heat of fusion (ΔH) of the propylene-α-olefin copolymer (A) is within the above-mentioned range, the balance among the solubility or dispersibility of the propylene-α-olefin copolymer (A) in the organic solvent and other resins, the blocking resistance of a coating film obtained by applying the coating material and the adhesiveness between the coating film and base materials become excellent.

Here, even though the melting point (Tm) of the propylene-α-olefin copolymer (A) obtained from DSC is relatively small, the hardness and balance of the propylene-α-olefin copolymer (A) are excellent. Consequently, the propylene-α-olefin copolymer (A) achieves a particularly good balance between the solubility or dispersibility of the propylene-α-olefin copolymer (A) included in the olefin-based coating material and the blocking resistance of a coating film obtained by application of the coating material. Although the reasons are not clear, it is assumed to be due to the ΔH of the melting peak showing bigger-than-expected values, despite the relative low melting point (Tm) of the propylene-α-olefin copolymer (A) obtained from DSC.

Also, the shape of the DSC curve for the propylene-α-olefin copolymer (A) (the ¼ width (x1), ¾ width (x2) and ratio (x1/x2) of the crystal melting peak obtained from DSC) is preferably in the range of 2 to 5.5, more preferably 3 to 5, even more preferably 3.1 to 4.0, and particularly preferably 3.2 to 3.7. When the ratio of ¼ width and ¾ width of the crystal melting peak of the propylene-α-olefin copolymer (A) obtained from DSC is within the above-mentioned range, the balance among the stability and the coating property of the olefin-based coating material and the blocking resistance of a coating film is excellent. Although the reasons are not clear, when the ratio of ¼ width and ¾ width of the crystal melting peak is bigger than the above-mentioned lower limit, the propylene-α-olefin copolymer (A) tends to have an appropriate composition distribution; and thus, it seems that the compatibility of the propylene-α-olefin copolymer (A) with the organic solvent and other resins is enhanced, and the stability and coating property of the coating material is improved. Moreover, when the ratio is smaller than the upper limit, the components that cause stickiness are reduced, thereby enabling a good blocking resistance for an obtained coating film.

(vii) Degree of Crystallinity

The degree of crystallinity of the propylene-α-olefin copolymer (A) measured by X-ray diffraction is preferably between 40 to 70%, more preferably 45 to 65%, and particularly preferably 50 to 58%. When the degree of crystallinity of the propylene-α-olefin copolymer (A) measured by X-ray diffraction is within the range, the preservation stability of the olefin-based coating material is excellent. When the degree of crystallinity of the propylene-α-olefin copolymer (A) is higher than the above-mentioned lower limit, components that cause stickiness are produced less, so the blocking resistance of a coating film obtained from the olefin-based coating material improves. Meanwhile, when the degree of crystallinity of the propylene-α-olefin copolymer (A) is lower than the upper limit, the amount of crystalline components derived from the propylene-α-olefin copolymer (A), which seems to undermine the solubility or dispersibility of the coating material, decreases. As a result, the stability and the coating property of the olefin-based coating material are thought to be improved.

(viii) Penetration

The penetration of the propylene-α-olefin copolymer (A) is preferably at or below 10 dmm, and particularly preferably at or below 3 dmm from the viewpoint of the blocking resistance of a coating film.

The penetration is measured by the following method. The propylene-α-olefin copolymer (A) is dissolved melted in accordance with JIS K 2207, while avoiding partial overheating and preventing foaming. A sample composed of the propylene-α-olefin copolymer (A) is then placed at room temperature between 15 to 30° C. for 1 to 1.5 hours to solidify the sample. It is then maintained at 25° C. in a thermostat bath, and once the temperature is stabilized, a needle is set on the surface of the sample and the length of the needle penetrating in 5 seconds is defined as penetration (dmm).

(ix) Production Method of the Propylene-α-Olefin Copolymer (A)

The method of producing the propylene-α-olefin copolymer (A) mentioned earlier is not particularly limited; the propylene-α-olefin copolymer (A) can be produced, for instance, using a metallocene catalyst. Also, the propylene-α-olefin copolymer (A) can be produced through thermal decomposition of a propylene-α-olefin copolymer (A-1) of relatively high molecular weight. The purification method of the propylene-α-olefin copolymer (A) is not particularly limited. Examples of the purification method include solvent fractionation based on the difference of solubility in organic solvent.

In case the propylene-α-olefin copolymer (A) is produced directly by a polymerization reaction, the melting point, the molecular weight and the intrinsic viscosity [η] of the resultant propylene-α-olefin copolymer (A) can be controlled by adjusting, for instance, the amount of α-olefins, the type of polymerization catalyst, the polymerization temperature and the amount of hydrogen added during polymerization.

However, the propylene-α-olefin copolymer (A) is preferably produced through thermal decomposition of a propylene-α-olefin copolymer (A-1) of relatively high molecular weight. The propylene-α-olefin copolymer (A) obtained through thermal decomposition of a propylene-α-olefin copolymer (A-1) of high molecular weight has good affinity with other resins and additives included in the olefin-based coating material, and thus, the olefin-based coating material is excellent in stability. Furthermore, a coating film obtained from the olefin-based coating material tends to show good adhesiveness to base materials. The propylene-α-olefin copolymer (A-1) of high molecular weight will be described hereunder.

The thermal decomposition methods of the propylene-α-olefin copolymer (A-1) of high molecular weight include a thermal decomposition by supplying the propylene-α-olefin copolymer (A-1) of high molecular weight into an extruder under an inert environment, such as in nitrogen, thereby heating, kneading and extruding the copolymer; supplying the propylene-α-olefin copolymer (A-1) of high molecular weight into an extruder, to which a tube reactor is connected at the latter end thereof, and carrying out thermal decomposition continuously within the tube reactor; or, charging the propylene-α-olefin copolymer (A-1) of high molecular weight into a thermal decomposition reactor and stirring batchwise for thermal decomposition. The temperature for thermal decomposition of the propylene-α-olefin copolymer (A-1) of high molecular weight is preferably in the range of 300 to 450° C., more preferably 350 to 430° C., and particularly preferably 370 to 410° C. By increasing the thermal decomposition time and/or temperature, the molecular weight is lowered, and thus, the amount of vinylidene groups increases.

(Propylene-α-Olefin Copolymer (A-1) of High Molecular Weight)

The propylene-α-olefin copolymer (A-1) of high molecular weight for the production of the propylene-α-olefin copolymer (A) described above contains propylene-derived structural units (a') in amounts of 60 to 90 mol %, and structural units (b') derived from α-olefins having 4 or more carbon atoms in amount of 10 to 40 mol %. Here, the sum of (a') and (b') equals 100 mol %.

The content of the propylene-derived structural units (a') of the propylene-α-olefin copolymer (A) is preferably in the range of 65 to 88 mol %, more preferably 70 to 85 mol %, and even more preferably 75 to 82 mol %. Thus, the upper limit of the propylene-derived structural units (a') is 90 mol %, preferably 88 mol %, more preferably 85 mol %, and even more preferably 82 mol %. On the other hand, the lower limit of the propylene-derived structural units (a') is 60 mol %, preferably 65 mol %, more preferably 70 mol %, and even more preferably 75 mol %.

Meanwhile, the content of the structural units (b') derived from α-olefins having 4 or more carbon atoms of the propylene-α-olefin copolymer (A-1) is preferably in the range of 12 to 35 mol %, more preferably 15 to 30 mol %, and even more preferably 18 to 25 mol %. Thus, the upper limit of the structural units (b') derived from α-olefins having more than 4 carbon atoms is 35 mol %, preferably 30 mol %, and more preferably 25 mol %. On the other hand, the lower limit is 10 mol %, preferably 12 mol %, more preferably 15 mol %, and even more preferably 18 mol %.

Examples of the α-olefins having 4 or more carbon atoms, which are constituting the propylene-α-olefin copolymer (A-1) of high molecular weight, include 1-butene, 1-hexene, 4-methyl-1-pentene, 1-octene and 1-decene. The α-olefins having 4 or more carbon atoms are preferably α-olefins having 4 to 10 carbon atoms, more preferably α-olefins having 4 to 8 carbon atoms, and particularly preferably 1-butene.

The propylene-α-olefin copolymer (A-1) of high molecular weight may contain propylene and olefins other than α-olefins having 4 or more carbon atoms. Specifically, structural units derived from ethylene may be included in amounts of less than 10 mol % in the total content (mol) of structural units of the propylene-α-olefin copolymer. However, from the perspective of properties of the obtained propylene-α-olefin copolymer (A), it is desirable not to include ethylene-derived structural units.

The melting point (Tm) of the propylene-α-olefin copolymer (A-1) of high molecular weight, obtained from DSC, is generally in the range of 60 to 120° C., preferably 65 to 100° C., and more preferably 70 to 90° C.

Also, the half-width of the peak melting point of the propylene-α-olefin copolymer (A-1) of high molecular weight, obtained from DSC, is generally 1 to 20° C., preferably 2 to 18° C., more preferably 3 to 15° C., and even more preferably 4 to 12° C.

The ΔH of the melting peak of the propylene-α-olefin copolymer (A-1) of high molecular weight, obtained from DSC, is preferably 30 to 100 J/g, more preferably 35 to 75 J/g, even more preferably 35 to 65 J/g, and particularly preferably 40 to 55 J/g.

The density of the propylene-α-olefin copolymer (A-1) of high molecular weight measured in accordance with density gradient tube method of JIS K 7112 is preferably between 850 to 910 (kg/m$^3$).

The weight-average molecular weight (Mw) of the propylene-α-olefin copolymer (A-1) of high molecular weight measured by GPC is preferably 50,000 to 1,000,000, more preferably 70,000 to 800,000, and even more preferably 100,000 to 600,000. The weight-average molecular weights (Mw) are expressed in terms of polypropylene.

Also, the molecular weight distribution (Mw/Mn) of the propylene-α-olefin copolymer (A-1) of high molecular weight, measured by GPC, is generally at or below 3, preferably 1.8 to 3.0, and more preferably 1.9 to 2.5

The propylene-α-olefin copolymer obtained through thermal decomposition of the propylene-α-olefin copolymer (A-1), which does not satisfy the above-described requirements, tend to have a wider half-width of the peak melting point, obtained from DSC, in which the half-width may exceed 20° C. Also, the ΔH of the melting peak obtained from DSC tends to be smaller, for example, less than 40 J/g.

In this regard, the propylene-α-olefin copolymer (A) obtained through thermal decomposition of the propylene-α-olefin copolymer (A-1) of high molecular weight, which satisfies the above-described requirements, is moderate in the extent of the half-width obtained from DSC, which may be within the range of 1 to 20° C. Moreover, the ΔH of the melting peak obtained from DSC increases, for instance, within the range of 40 to 100 J/g.

Here, the propylene-α-olefin copolymer (A-1) of high molecular weight, with small half-width, shows a small difference in the amount of α-olefins contained in each molecule. As a result, the content of α-olefins included in each molecule in the propylene-α-olefin copolymer (A), obtained through thermal decomposition of the propylene-α-olefin copolymer (A-1), tend to be uniform. Hence, the crystallinity of the obtained propylene-α-olefin copolymer (A) is hardly undermined, and rather, the crystallinity may be higher than that of the propylene-α-olefin copolymer (A-1) of high molecular weight. This is also apparent from the increase in the melting peak ΔH of the propylene-α- olefin copolymer (A). Therefore, when a propylene-α-olefin copolymer (A) is obtained by thermal decomposition of a propylene-α-olefin copolymer (A-1) of high molecular weight with small half-width, an unexpected copolymer with high crystallinity at a low melting point can be obtained.

On the other hand, the propylene-α-olefin copolymer (A-1) with large half-width, for instance, exceeding 20° C., shows a difference in the amount of α-olefins contained in each molecule. Also, molecules containing a large content of α-olefins are easily thermally decomposed. As a result, the propylene-α-olefin copolymer obtained by thermal decomposition of the propylene-α-olefin copolymer (A-1) contains components of extremely low molecular weight. When such components of extremely low molecular weight are included, the crystallinity of the propylene-α-olefin copolymer (A) is assumed to be lowered.

The propylene-α-olefin copolymer (A-1) can be produced by various known methods. The methods include a high pressure process, and methods in which Ziegler catalyst or metallocene catalyst is used, but it is preferable to use a method in which metallocene catalyst is used. Examples of known metallocene catalysts include supported titanium-magnesium catalyst disclosed in Japanese Patent Application Laid-Open No. 57-63310, Japanese Patent Application Laid-Open No. 58-83006, Japanese Patent Application Laid-Open No. 03-706, Japanese Patent No. 3476793, Japanese Patent Application Laid-Open No. 04-218508 and Japanese Patent Application Laid-Open No. 2003-105022, and catalysts disclosed in WO 01/53369, WO 01/27124, WO 2004/087775, Japanese Patent Application Laid-Open No. 03-193796 or Japanese Patent Application Laid-Open No. 02-41303.

2. Organic Solvent

The organic solvent included in the solution or dispersion of the propylene-α-olefin copolymer (A) is not particularly limited as long as the propylene-α-olefin copolymer (A) can be dissolved or dispersed therein. Preferred examples of the organic solvent include aromatic hydrocarbons such as benzene, toluene and xylene; aliphatic hydrocarbons such as hexane, heptane, octane, decane; alicyclic hydrocarbons such as cyclohexane, cyclohexene, methylcyclohexane and ethylcyclohexane; halogenated hydrocarbons such as trichloroethylene, dichloroethylene and chlorobenzene; alcohols such as methanol, ethanol, isopropyl alcohol, butanol, pentanol, hexanol, propanediol and phenol; ketones such as acetone, methyl isobutyl ketone, methyl ethyle ketone pentanone, hexanone, isophorone and acetophenone; cellosolves such as methyl cellosolve and ethyl cellosolve; esters such as methyl acetate, ethyl acetate, butyl acetate, methyl propionate and butyl formic acid; ethers such as tetrahydrofuran; and pyrrolidones such as N-methyl pyrrolidone. The organic solvents may be used singly, or two or more may be used in combination in the solution or dispersion. Of these, it is preferable to use hydrocarbon solvents such as aromatic hydrocarbons, aliphatic hydrocarbons, alicyclic hydrocarbons, alcohol solvents and ester solvents.

Here, the solubility parameter of the organic solvent included in the solution or dispersion preferably satisfies the range described hereunder. The solvents of which the below-described solubility parameter is within the desired range include aromatic hydrocarbons such as benzene, toluene and xylene; aliphatic hydrocarbons such as hexane, heptane, octane, decane; alicyclic hydrocarbons such as cyclohexane, cyclohexene, methylcyclohexane and ethylcyclohexane; alcohols having 4 to 12 carbon atoms such as isopropyl alcohol, dodecanol and butanol; esters having 4 to 12 carbon atoms such as ethyl acetate, butyl acetate and phthalate ester; and pyrrolidones such as N-methyl pyrrolidone. The organic solvents may be used singly, or two or more may be used in combination in the solution or dispersion.

Furthermore, from the view point of environmental protection, it is more preferable to use aliphatic hydrocarbon solvents, alicyclic hydrocarbon solvents, and particularly preferably methylcyclohexane and ethylcyclohexane. The propylene-α-olefin copolymer (A) shows good compatibility with methylcyclohexane and ethylcyclohexane, and thus, with these as organic solvent, dissolution of the propylene-α-olefin copolymer (A) is possible without increasing the temperature excessively during production of the olefin-based coating material. The time taken for dissolving propylene-α-olefin copolymer (A) is reduced. Also, methylcyclohexane and ethylcyclohexane as solvents will produce coating films that are uniform, obtained by application of the olefin-based coating material.

(SP Value of the Organic Solvent)

The solubility parameter (SP value, unit $(cal/cm^3)^{1/2}$) of the organic solvent included in the solution or dispersion is not particularly limited, but the SP value is preferably in the range of 7.0 to 13.0, more preferably 7.2 to 12.0, even more preferably 7.5 to 9.5, particularly preferably 7.7 to 9.0, and even more preferably 7.7 to 8.5. When the SP value of the organic solvent falls in the above range, the solubility or dispersibility of the propylene-α-olefin copolymer (A) in the organic solvent improves, and at the same time, the stability as a coating material is also enhanced. In particular, when the SP value of the organic solvent is between 7.7 and 8.5, the propylene-α-olefin copolymer (A) completely dissolves at room temperature very easily, and thus the dissolution operation becomes easy and the coating film obtained from applying the olefin-based coating material is uniform.

The 'solubility parameter (SP value)' is a value disclosed in Polymer Handbook, Fourth Edition (Edited by: Brandrup, J.; Immergut, Edmund H.; Grulke, Eric A.; Abe, Akihiro; Bloch, Daniel R. 1999), WILEY-INTERSCIENCE, etc. The SP value of a mixed solvent is calculated by multiplying SP value of each solvent component, comprising the mixed solvent, with volume fraction.

3. Dissolution/Dispersion of the Propylene-α-Olefin Copolymer (A) in an Organic Solvent The method of dissolving or dispersing the propylene-α-olefin copolymer (A) in an organic solvent is not particularly limited. For instance, the methods include mixing the propylene-α-olefin copolymer (A) and the organic solvent, and stirring the resultant mixture to dissolve or disperse the propylene-α-olefin copolymer (A) in the organic solvent; mixing the propylene-α-olefin copolymer (A) and the organic solvent, increasing the temperature while stirring the mixture; and stirring the mixture of the organic solvent and the propylene-α-olefin copolymer (A) while increasing the temperature to completely or partially dissolve the propylene-α-olefin copolymer (A) and, then, slowly cooling the resultant mixture to thereby atomize the copolymer within the organic solvent.

The method of atomizing the propylene-α-olefin copolymer (A) within the organic solvent is not particularly limited. An exemplary method is as follows: the solvent composition is set in advance so that the propylene-α-olefin copolymer is precipitated at 60 to 100° C., and the mixture of the propylene-α-olefin copolymer (A) and the organic solvent is heated to completely or partially dissolve the mixture. The mixture is then cooled at the average cooling speed of 1 to 20° C. per hour, preferably 2 to 10° C. per hour, for 60 to 100° C., to thereby precipitate the propylene-α- olefin copolymer (A). The propylene-α-olefin copolymer (A) may also be dissolved in a good solvent, followed by precipitation of the propylene-α-olefin copolymer by the above-mentioned method, and adding a poor solvent into the solution to further precipitate the propylene-α-olefin copolymer.

The propylene-α-olefin copolymer (A) is preferably completely dissolved in an organic solvent included in the olefin-based coating material, that is, the organic solvent included in the solution or dispersion, at a temperature of 50° C. or above. The solubility can be checked at any concentration, as long as the concentration of the propylene-α-olefin copolymer is 0.1 to 55 parts by mass per 100 parts by mass of the organic solvent. The concentration of the propylene-α-olefin copolymer for checking the solubility is preferably not less than 10 parts by mass, more preferably not less than 20 parts by mass, and particularly preferably not less than 35 parts by mass per 100 parts by mass of the organic solvent. Also, in case the concentration of the propylene-α-olefin copolymer, when dissolved in the organic solvent, is 10 mass %, the propylene-α-olefin copolymer is preferably completely dissolved at temperatures not higher than 50° C., and more preferably at temperatures not higher than 30° C. The solubility of the propylene-α-olefin copolymer (A) can be visually checked.

When the propylene-α-olefin copolymer (A) is dissolved in the organic solvent at low temperatures, a coating film can be formed at low coating temperatures. Also, the propylene-α-olefin copolymer (A) can be coated while dispersed in the organic solvent of the olefin-based coating material, but in such a case, the propylene-α-olefin copolymer (A) may have to be baked at a temperature higher than its melting point to improve the coating film state.

Meanwhile, when the propylene-α-olefin copolymer (A) does not dissolved in the organic solvent included in the olefin-based coating material, that is, the organic solvent included in the solution or dispersion, the propylene-α-olefin copolymer (A) should preferably have a high dispersibility in the organic solvent. The dispersibility of the propylene-α-olefin copolymer (A) is determined, for example, with methylcyclohexane solution of which the concentration of the propylene-α-olefin copolymer (A) is 10 mass %. Specifically, the solution is kept still for 1 day, and if no non-uniformity such as sedimentation is visually confirmed, the dispersibility of the propylene-α-olefin copolymer (A) in the organic solvent is determined to be good.

The solubility and dispersibility of the propylene-α-olefin copolymer (A) in the organic solvent can be adjusted by the concentration of the propylene-α-olefin copolymer (A), but it can also be adjusted by the structural units and the intrinsic viscosity of the propylene-α-olefin copolymer (A).

4. In Regards to the Olefin-Based Coating Material

As mentioned earlier, there are two forms for the olefin-based coating material of the present invention, in which the first olefin-based coating material is characterized by including a solution or dispersion of the propylene-α-olefin copolymer (A) dissolved or dispersed in the organic solvent. The second olefin-based coating material includes a solution of the propylene-α-olefin copolymer (A) and other resin (B) in the organic solvent.

In any of the two olefin-based coating materials, various additives may be added as required other than the solution or dispersion. Examples of additives included in the olefin-based coating material include, for example, other thermoplastic resins; various stabilizers such as antioxidants and weather stabilizers, heat resistant stabilizers, antistatic agents and anti-aging agents; various dyes such as phthalocyanine blue, azo dye and anthraquinone dye; various pigments such as azo pigment, titanium dioxide, molybdenum and carbon black; inorganic fillers such as calcium carbonate, talc, zinc white, glass fiber and magnesium sulfate; conductive chemicals such as carbon black and ferrite; carbon fiber; wetting agents; dispersing agents; thickener; levelling agents; slip agents; cissing inhibitors; slip-preventive agents; anti-blocking agents; antifogging agents; nucleating agents; lubricants; plasticizers; hydrochloric acid absorbents; and cryoprotectants. These additives are included to an extent that does not compromise the objective of the present invention.

The viscosity of the olefin-based coating material of the present invention can be checked at any concentration, as long as the concentration of the propylene-α-olefin copolymer is 0.1 to 55 parts by mass per 100 parts by mass of the organic solvent. The concentration of the propylene-α-olefin copolymer (A) when checking the viscosity is preferably not less than 10 parts by mass, more preferably not less than 20 parts by mass, and particularly preferably not less than 35 parts by mass per 100 parts by mass of the organic solvent. The method of adjusting the amounts of the propylene-α-olefin copolymer (A) and the organic solvent includes, for example, adding a solvent or the propylene-α-olefin copolymer (A) to the olefin-based coating material, as with the above-described dissolution/dispersion of the propylene-α-olefin copolymer (A) in the organic solvent. The viscosity of the olefin-based coating material of the present invention, for example, when the concentration of the propylene-α-olefin copolymer (A) in the coating material is 10 mass % (for instance, 10 parts by mass of olefin resin to 90 parts by mass of methylcyclohexane), is preferably 500 mPa-s or less in 60 rotational viscosity at 23° C. The lower limit is preferably 0.5 mPa-s, and more preferably 1 mPa-s. On the other hand, the upper limit is preferably 300 mPa-s, more preferably 30 mPa-s, and particularly preferably 10 mPa-s. With the 60 rotational viscosity in the above range, the olefin-based coating material of the invention can be used in various coating methods. When the viscosity is equal to or lower than the upper limit, the coating material becomes excellent in stability and handling property. Also, appearance of streaks and unevenness is restrained, and a coating film of even thickness is obtained. When the viscosity is equal to or higher than the lower limit, it is easier to secure the thickness of coating film, and can suppress penetration of the olefin-based coating material into base materials and deterioration of base materials.

Furthermore, for instance, even when the concentration of the propylene-α-olefin copolymer (A) in the coating material is 30 mass %, the olefin-based coating material preferably has 500 mPa-s or less in 60 rotational viscosity at 23° C. The lower limit is preferably 0.5 mPa-s, and more preferably 1 mPa-s. On the other hand, the upper limit is preferably 300 mPa-s, more preferably 30 mPa-s, and particularly preferably 10 mPa-s.

(The First Olefin-Based Coating Material)

The first olefin-based coating material of the present invention is characterized by including a solution or dispersion of the propylene-α-olefin copolymer (A) dissolved or dispersed in the organic solvent. As mentioned earlier, the first olefin-based coating material may contain additives as required other than the solution or dispersion.

Here, the solution or dispersion contains 0.1 to 55 parts by mass of the propylene-α-olefin copolymer (A) per 100 parts by mass of the organic solvent. The upper limit of the propylene-α-olefin copolymer (A) content is preferably not more than 40 parts by mass, more preferably not more than 25 parts by mass, and particularly preferably not more than 15 parts by mass. Also, the lower limit is not less than 3 parts by mass, and more preferably not less than 8 parts by mass.

When the amount of the propylene-α-olefin copolymer (A) is equal to or less than the above-mentioned upper limit per 100 parts by mass of the organic solvent, the coating material becomes excellent in stability and handling property. Also, streaks and unevenness are suppressed, and a coating film of even thickness is obtained. When the amount of propylene-α-olefin copolymer (A) is equal to or higher than the lower limit, it is easier to secure the thickness of coating film, and the coating film dries easily. Also, penetration of the olefin-based coating material into base materials and deterioration of base materials can be controlled.

The solution or dispersion in which the propylene-α-olefin copolymer (A) is dissolved or dispersed in the organic solvent can be produced by the methods described in 'Dissolution/dispersion of the propylene-α-olefin copolymer (A) in an organic solvent.' Also, the solution or dispersion and additives can be mixed using known methods.

(The Second Olefin-Based Coating Material)

The second olefin-based coating material of the present invention is characterized by including a solution of the propylene-α-olefin copolymer (A) and other resin (B) dissolved or dispersed in the organic solvent. As mentioned earlier, the second olefin-based coating material may contain additives as required other than the solution or dispersion.

Other resins included in the solution or dispersion include olefin resins, styrene resins, polyurethanes, polyesters, polyamides, polycarbonates, polyvinyl alcohols, polyvinyl acetates, epoxy resins, acrylic resins, rosin resins, alkyd resins, urea resins, melamine resins, phenol resins, coumarone resins, ketone resins, cellulosic resins, chlorinated polyolefins or mixtures of these resins.

From the perspective of compatibility with the propylene-α-olefin copolymer (A), the resins are selected preferably from olefin resins and styrene resins, and more preferably olefin elastomer and styrene elastomer. Olefin elastomer is particularly preferably propylene elastomer. Examples of propylene elastomer include propylene-1-butene copolymer and acid modified propylene-1-butene copolymer. Examples of propylene elastomer available on the market include Tanner XM 5070 (product name; manufactured by Mitsui Chemicals, Inc.). Meanwhile, styrene elastomer is preferably a block copolymer containing 10 to 60 mol % of styrene. Examples of styrene elastomer available on the market include Tuftec (product name; manufactured by Asahi Kasei Corporation), Septon (product name; manufactured by Kuraray Co., Ltd.) and Kraton (product name; manufactured by Shell plc.). When these olefin elastomer or styrene elastomer are included in the olefin-based coating material, coating films obtained by application of the olefin-based coating material become more adhesive to base materials made of metals or olefin resins.

Meanwhile, other resins included in the solution or dispersion may be graft-copolymerized with polar monomers. Examples of monomer include ethylenically unsaturated compound containing hydroxyl group, ethylenically unsaturated compound containing amino group, ethylenically unsaturated compound containing epoxy group, unsaturated carboxylic acid and anhydrides thereof and derivatives thereof, and vinyl ester compound. From the view point of enhancing other resins' solubility to the organic solvent and adhesiveness to materials, polar monomer is preferably unsaturated carboxylic acid or anhydrides thereof.

When other resins are included in the solution or dispersion, that is, when other resins are combined with the propylene-α-olefin copolymer (A), the stability and coating property of the olefin-based coating material of the invention, the blocking resistance of a coating film, and adhesiveness between the coating film and base materials are enhanced. The specific mechanism thereof is yet to be found out, but through compatibility of the propylene-α-olefin copolymer (A) and other resins, the viscosity of the olefin-based coating material is effectively reduced, and thereby the stability and coating property of the olefin-based coating material seems to be enhanced. Also, the combined use with other resins increases a coating film's following with respect to the base material, whereby adhesiveness between the coating film and base material is enhanced.

Here, the content ratio (mass ratio) of the propylene-α-olefin copolymer (A) and other resins in the solution or dispersion is generally 1/99 to 50/50 (when the sum of the propylene-α-olefin copolymer (A) and other resins (B) is 100 parts by mass), preferably 3/97 to 30/70, and more preferably 15/85 to 25/75. When the ratio is within the range, the stability and coating property of the second olefin-based coating material, the blocking resistance of a coating film, and adhesiveness between the coating film and base materials are improved. At the same time, various characteristics derived from other resins may appear, such as the solidity or thermal resistance of the coating film.

The content of the propylene-α-olefin copolymer (A) and other resins combined in the second olefin-based coating material is generally 0.1 to 55 parts by mass per 100 parts by mass of the organic solvent, of which the upper limit is preferably not more than 40 parts by mass, more preferably not more than 30 parts by mass, and particularly preferably not more than 25 parts by mass. Also, the lower limit is preferably not less than 3 parts by mass, more preferably no less than 8 parts by mass, more preferably not less than 15 parts by mass, and particularly preferably not less than 20 parts by mass.

The solution or dispersion of the propylene-α-olefin copolymer (A) and other resin (B) dissolved or dispersed in the organic solvent can, for example, be produced by dissolving or dispersing other resin (B) in the organic solvent with the propylene-α-olefin copolymer (A). Alternatively the solution or dispersion in which the propylene-α-olefin copolymer (A) is dissolved or dispersed in the organic solvent and the solution in which other resin (B) is dissolved or dispersed in the organic solvent are prepared separately, and mixed together. The solution or dispersion and additives can be mixed using known methods.

(Other Olefin-Based Coating Materials)

Furthermore, the olefin-based coating material of the present invention can be a propylene-α-olefin copolymer (A) dispersed in water, or a propylene-α-olefin copolymer (A) and other resin dispersed in water. Additives and the like may be included in the olefin-based coating material as needed.

5. The Use of and the Method of Using the Olefin-Based Coating Material

The olefin-based coating material of the present invention may be used as a coating material for painting various industrial goods, surface coatings, primers, water repellants, adhesives, heated sealants, binders for ink, glazing agents for ink, grip agents for ink, shoes coatings, binders for thermal melt-layer of thermal ink transfer recording media, spray release agents, mold release agents, various release agents, resin modifiers, filler dispersants, pigment dispersants and binders for ceramic. The olefin-based coating material of the invention can be applied directly on a material to be coated, and can be mixed with various fillers, pigments and inks. Alternatively, the solvent may be removed from the olefin-based coating material, and then the resin components are dissolved or dispersed in any solvent and applied on the material to be coated.

When directly applying the olefin-based coating material on the material to be coated, the application method is not particularly limited; application may be performed using a spray, brush or coater. The components of the olefin-based coating material are not easily separated, so for example, can adhere to (be applied to) the material to be coated by spraying on the surface with a spray gun. The temperature at which the olefin-based coating material is sprayed is not particularly limited. The olefin-based coating material can be applied after heated or at room temperature.

In the olefin-based coating material of the invention, the organic solvent included in the coating material is dried after application, thereby producing a coating film that is not sticky. The drying method of the olefin-based coating material is not particularly limited, and it can either be air dried or forcibly dried by heating.

When the olefin-based coating material is used to coat the surface of various molded articles, the mechanical properties of the coated surface can be improved. When the olefin-based coating material is used as a primer before applying various painting agents, the adhesiveness of the painting agents with the primer layer improves. Also, images obtained by applying various coating agents have improved definition. Examples of various coating agents applied on a coating film (primer layer) of the olefin-based coating material include solvent-based thermoplastic acrylic resin coating agents, solvent-based thermosetting acrylic resin coating agents, acryl modified alkyd resin coating agents, polyester coating agents, epoxy resin coating agents, polyurethane resin coating agents and melamine resin coating agents. These coating agents can be applied using known coating methods such as electric spray painting, spray coating and brush painting. Also, images can be obtained by hardening a coating film using standard methods such as heating with nichrome wire, infrared ray and high frequency wave.

When the olefin-based coating material is used as an additive for print ink, the storage stability of the print ink will be maintained. Furthermore, printed products using such print ink will have improved tolerance to wear and tear, abrasion and flaw.

When the olefin-based coating material is used for a binder for thermal melt-layer, equivalent to ink layer or release layer, of thermal ink transfer recording medium, extra components such as dispersant do not have to be used on the composition for the thermal melt-layer. Also, rub resistance or image definition of a coating film obtained from thermal ink transfer can be improved. Moreover, excessive heating is unnecessary during thermal ink transfer, thereby contributing to print energy conservation.

When the olefin-based coating material is used as modifiers for various resins, the adhesiveness of these resins with a substrate (material to be coated) is improved. Examples of various resins that can be modified by the olefin-based coating material of the invention include polyurethanes, polyesters, polyamides, polycarbonates, polyvinyl alcohols, polyvinyl acetates, epoxy resins, acryl resins, rosin resins, alkyd resins, urea resins, melamine resins, phenol resins, coumarone resins, ketone resins, cellulosic resins, chlorinated polyolefins or mixtures of these resins.

The method of mixing the olefin-based coating material with various inks, resins or fillers is not particularly limited, and can use known stirring methods or kneading methods.

Examples of the material to be coated with the olefin-based coating material (substrate) include molded articles including polyolefin such as high-pressure polyethylene, a moderate- or low-pressure polyethylene, polypropylene, poly-4-methyl-pentene and polystyrene; and olefin copolymer such as ethylene-propylene copolymer, ethylene-butene copolymer and propylene-butene copolymer. The olefin-based coating material of the present invention is particularly preferable for outer coating agents or primers of molded articles, including polypropylene, ethylene-propylene copolymers, ethylene-butene copolymers and propylene-butene copolymers.

Other than the above-described polyolefin and olefin copolymer, the olefin-based coating material is also preferably used for molded articles composed of polypropylene and synthetic rubber, molded articles such as car bumpers which are composed of polyamide resins, unsaturated polyester resins, polybutylene terephthalate resins or polycarbonate resins, and further for surface treatment of steel sheets or electro-coated steels, and for outer coatings, primers, adhesives and binders for ink.

The olefin-based coating material is also preferably used for SMC articles using unsaturated polyester resin or epoxy resin, R-RIM articles using polyurethane resin, glass fiber reinforced polyamide resin articles, polyurethane resin articles, and as primer for cation electro-coated steel.

The olefin-based coating material is also preferably used as a primer for surface on which coating agent, primer or adhesive whose main components are polyurethane resin, fatty acid modified polyester resin, oil-free polyester resin, melamine resin and epoxy resin is applied.

Here, the materials to be coated with the olefin-based coating material (molded articles) may for example be those obtained by molding the above-described copolymers or resins using any of the methods of injection molding, compressing molding, blow molding, extrusion molding and rotational molding.

Furthermore, the molded article to be coated with the olefin-based coating material may contain inorganic fillers and pigments such as calcium carbonate, talc, zinc oxide, glass fiber, titanium white and magnesium sulfate. According to the olefin-based coating material of the present invention, a desired coating film can be formed even when various fillers and pigments are included in the molded article.

The molded article to be coated with the olefin-based coating material may further contain various stabilizers, ultraviolet ray absorbents and hydrochloric acid absorbents. According to the olefin-based coating material of the present invention, a desired coating film can be obtained even when various stabilizers, ultraviolet ray absorbent or hydrochloric acid absorbent are included in the molded article.

Examples of stabilizer include phenolic stabilizers such as 2,6-di-t-butyl-4-methylphenol, tetrakis[methylene(3,5-di-t-butyl-4-hydroxyphenyl)propionate]methane, methaoctadecyl-3-(4'-hydroxy-3,5-di-t-butylphenyl)propionate, 2,2'-methylenebis(4-methyl-6-t-butylphenol), 4,4'-butylenebis(3-methyl-6-t-butylphenol), 4,4'-thiobis(3-methyl-6-t-butylphenol), 2,2'-thiobis(4-methyl-6-t-butylphenol), 1,3,5-trimethyl-2,4,6-tris(3,5-di-t-butyl-4-hydroxybenzyl)benzene, 1,3,5-tris(2-methyl-4-hydroxy-5-t-butylphenol)butane; sulfuric stabilizers such as dilauryl thiodipropionate and distearyl thiodipropionate; and phosphoric stabilizers such as tridecyl phosphite and trisnonyphenyl phosphite.

Examples of the ultraviolet absorbent include 2-hydroxy-4-octoxybenxophenone, 2-ethylhexyl-2-cyano-3,3-diphenylacrylate and para-octylphenyl salicylate. An example of the hydrochloric acid absorbent is preferably calcium stearate.

EXAMPLES

<Measurement Methods>
Properties in Examples and Comparative Examples are calculated based on the measurement methods hereinbelow.

(Composition of Propylene-α-Olefin Copolymer)

The amount of propylene-derived structural units and the amount of structural units derived from α-olefins having more than 4 carbon atoms are measured by the analysis of $^{13}$C-NMR spectrum.

(Molecular Weight and Molecular Weight Distribution)

The weight-average molecular weight (Mw) of the propylene-α-olefin copolymer (A) was calculated by GPC measurement. GPC measurement was performed under the following conditions. Also, the weight-average molecular weight (Mw) and the number-average molecular weight (Mn) were calculated based on the conversion method described hereinbelow after drawing a calibration curve, using monodispersed standard polystyrene available in the market.

Equipment: Gel Permeation Chromatograph Alliance GPC-2000 (manufactured by Waters)
Organic solvent: o-Dichlorobenzene
Column: TSKgel GMH6-HT×2, TSKgel GMH6-HTL column×2 (all manufactured by Tosoh Corporation)
Flow rate: 1.0 ml/min
Sample: 0.15 mg/mL o-dichlorobenzene solution
Temperature: 140° C.
Molecular Weight Conversion: PP Conversion/by a Universal Calibration Method In calculation using a universal calibration method, coefficient in Mark-Houwink equation was used. The Mark-Houwink coefficients used for PS (polystyrene) and PP (polypropylene) are figures disclosed in documents J. Polym. Sci., Part A-2, 8, 1803 (1970) and Makromol. Chem., 177, 213 (1976), respectively.

(The Amount of Unsaturated Terminal (Vinylidene) Groups)

The amount of terminal vinylidene group included in the propylene-α-olefin copolymer (A) was measured by $^1$H-NMR. For the measurement, nuclear magnetic resonance device JNM-ECX400P, manufactured by JEOL Ltd., was used, wherein 20 mg of sample was completely dissolved in 0.5 ml of deuterated o-dichlorobenzene inside an NMR sampling tube (5 mmφ) and measurement was performed at 120° C.

The integrated intensity of the entire signal derived from propylene polymer was normalized at 2,000, and the amount of terminal vinylidene was quantified at peak integrated intensity/2 proton (C) derived from vinylidene, observed in the vicinity of 4.7 ppm, calculated based on the equation hereinbelow.

The amount L of terminal vinylidene (unit/1,000 carbons) =C/2

(Melting Point (Tm))

The melting point (Tm) of a propylene-α-olefin copolymer was measured by DSC (differential scanning calorimetry) with DSC-20 (manufactured by Seico Electronics Industrial Co., Ltd.). The endothermic peak of a curve, obtained from heating about 10 mg of sample from −20° C. to 200° C. at the rate of 10° C./min, was defined as the melting point. Before the measurement under heating, the sample (copolymer) was heated to about 200° C., maintained for 5 minutes, and was cooled to constant temperature (−20° C.) at the rate of 10° C./min in order to standardize the heat history of the sample (copolymer).

(Half-Width of the Peak Melting Point)

The peak width (° C.) of an endothermic peak, obtained from DSC, at a point where the peak height becomes half of the value measured from the base line of the entire endothermic peakto the endothermic peak top was defined as half-width.

(Heat of Fusion (ΔH))

The heat of fusion (ΔH: J/g) was calculated from the area delimited by the endothermic peak, obtained from DSC, and the base line of the entire endothermic peak.

(Shape of DSC Curve)

The ratio of ¼-width and ¾-width of crystal melting peak obtained from the results of DSC was defined as a shape of the DSC curve. The shape of the DSC curve was determined relative to the height of the peak measured from the base line of the entire endothermic peak obtained from DSC to the endothermic peak top, wherein a ratio (X1/X2) was determined using peak width X1 (° C.) for a point where the height from the base line becomes ¼ of the peak height and peak width X2 (° C.) for a point where the height from the base line becomes ¾ of the peak height.

(Degree of Crystallinity)

The sample for measurement was heated at 180° C. for 5 minutes on a hot press, and was cooled in cold water for 5 minutes on a cold press to produce a 1 mm-thick press sheet. In regards to the obtained press sheet, an X-ray diffractometer (RINT2500 manufactured by Rigaku Corporation), which has a rotational sample holder, was used to measure wide-angle X-ray diffraction profile wherein 20 was within the range of 5° to 35°, under the condition of Cu-Ka ray and 50 kV-300 mA.

From the obtained X-ray diffraction profile, parts derived from crystal and non-crystal were separated, and the degree of crystallinity was calculated from each diffraction intensity ratio.

Production Examples

Production Example 1

A thoroughly nitrogen-purged 2,000 ml polymerization apparatus was loaded with 900 ml of dry hexane, 65 g of 1-butene and 1.0 mmol of triisobutylaluminum at room temperature. The temperature of the polymerization apparatus was raised to 70° C., and was pressurized with propylene to 0.7 MPa. After that, a toluene solution contacted with 0.002 mmol of dimethylmethylene (3-tert-butyl-5-methylcyclopentadienyl) fluorenyl zirconium dichloride and 0.6 mmol (in terms of aluminum) of methylaluminoxane (manufactured by Tosoh Finechem Corporation) was added into the polymerization apparatus. Polymerization was performed for 30 minutes at internal temperature of 62° C., while maintaining the propylene pressure at 0.7 Mpa, and 20 ml of methanol was added to quench the polymerization. After venting, polymers were precipitated from the polymerized solution within 2 L of methanol, and were dried for 12 hours at 130° C. in vacuum to obtain propylene-1-butene copolymer (a). The properties of the obtained propylene-1-butene copolymer (a) are shown in Table 1.

Production Example 2

A 1.5 L stainless pyrolysis apparatus equipped with a stirring device, nitrogen inlet tube and condenser was loaded with 200 g of the propylene-1-butene copolymer (a)

obtained from Production Example 1, and the pyrolysis apparatus was thoroughly purged with nitrogen. While inflowing nitrogen, the temperature of the pyrolysis apparatus was raised to 380° C. for dissolution of resin, and stirring was started. Once the resin temperature within the system reached a prescribed temperature, it was heated for 2.5 hours for thermal decomposition of the propylene-1-butene copolymer (a). The pyrolysis apparatus was then cooled to room temperature to obtain propylene-1-butene copolymer (b) shown in Table 1.

Production Example 3

The procedures in Production Example 2 were repeated to obtain propylene-1-butene copolymer (c), except that the heating time for thermal decomposition of the propylene-1-butene copolymer (a), obtained from Production Example 1, was changed to 4.5 hours. The properties of the obtained propylene-1-butene copolymer (c) are shown in Table 1.

Production Example 4

The procedures in Production Example 2 were repeated to obtain propylene-1-butene copolymer (d), except that the heating time for thermal decomposition of the propylene-1-butene copolymer (a), obtained from Production Example 1, was changed to 6 hours. The properties of the obtained propylene-1-butene copolymer (d) are shown in Table 1.

Production Example 5

The procedures in Production Example 1 were repeated to obtain propylene-1-butene copolymer (a'), except that 30 g of 1-butene was used rather than 65 g of 1-butene in polymerization.

Also, the procedures in Production Example 3 were repeated to obtain propylene-1-butene copolymer (e), except the propylene-1-butene copolymer (a') was used as a material for thermal decomposition.

[PP Wax]

PP (polypropylene) wax NP055 manufactured by Mitsui Chemicals was used. The properties of the PP wax are shown in Table 1.

Example 2. The resultant mixture was stirred with a stirring apparatus equipped with a heater, thereby obtaining the olefin-based coating material.

<Evaluation of the Olefin System>

The solubility, viscosity, stability in a stationary state, coating property, blocking resistance of a coating film and adhesiveness of the coating film are evaluated in accordance with the evaluation criteria hereinbelow. The results are described in Table 2.

<Solubility of Resin>

In the process of production of the olefin-based coating material, the stirring apparatus was appropriately halted, and solubility (at room temperature) was measured according to the criteria hereinbelow.

A: The resin was dissolved quickly and the coating material was transparent.

B: The resin was dissolved by 60 minutes after start of stirring and the coating material was transparent.

C: The resin was partially dissolved and the remainder of the polymer was dispersed.

F: The resin swelled, gelated or was insoluble.

The coating material was then heated with a heater to 40° C. and was stirred for 1 hour. The stirring apparatus was stopped again to evaluate solubility (at 40° C.) according to the same criteria as that used at room temperature. The same method was used to evaluate solubility (at 50° C.).

<Viscosity>

The 60 rotational viscosity of the olefin-based coating material (concentration of the propylene-1-butene copolymer (b): 10 mass %) was measured with a B-type viscometer at room temperature (23° C.). The value read after 30 seconds was defined as the viscosity of the coating material (mPa·s).

<Stability in a Stationary State>

After preparing the olefin-based coating material, the coating material was allowed to stand still at room temperature for one day, and the state of the coating material was evaluated in accordance with the following criteria.

A: The resin remains dissolved or dispersed.

B: The resin is partially separated, but is easily re-dispersed.

TABLE 1

| Propylene-α-olefin copolymer | | Production Example 1 | Production Example 2 | Production Example 3 | Production Example 4 | Production Example 5 | PP Wax |
|---|---|---|---|---|---|---|---|
| Mw | — | 230,000 | 15,000 | 9,300 | 7,100 | 10,600 | 7,800 |
| Propylene content | mol % | 79 | 79 | 79 | 80 | 89 | 97 |
| 1-butene content | mol % | 21 | 21 | 21 | 20 | 11 | — |
| Ethylene content | mol % | — | — | — | — | — | 3 |
| Terminal unsaturated group (vinylidene) content | unit/1,000 carbon atoms | <0.1 | 2.5 | 3.0 | 3.1 | 2.1 | 4.1 |
| Half-width of peak melting point | ° C. | 6 | 14 | 13 | 16 | 10 | 10 |
| Melting point (Tm) | ° C. | 86 | 81 | 78 | 74 | 93 | 138 |
| Heat of fusion (ΔH) | J/g | 45 | 50 | 50 | 49 | 59 | 90 |
| DSC curve shape | — | 3.8 | 3.4 | 3.6 | 3.6 | 3.5 | 4.3 |
| Degree of crystallinity | % | 48 | 53 | 54 | 56 | 62 | 60 |

Example 1

<Production of the Olefin-Based Coating Material>

A 200 ml conical flask was loaded with 90 g of methyl-cyclohexane (SP value 7.8 $(cal/cm^3)^{1/2}$) as an organic solvent, followed by addition of 10 g of the propylene-1-butene copolymer (b) which was polymerized in Production F: The resin cannot be re-dispersed due to gelation and generation of slurry.

<Coating Property>

On the surface of PET (polyethylene terephthalate) film and PP (polypropylene) film, the olefin-based coating material was applied using a flexible film thickness applicator, so that the coating film was 5 μm thick. After drying the coating film at room temperature and then at 160° C. for 30 seconds, the surface state was observed.
A: The coating film was transparent and even.
B: The coating film was slightly murky, but even.
C: The coating film was partially uneven.
F: The coating film definitely had streaks and unevenness.
<Blocking Resistance>
A coating film was produced in the same procedures as in the coating property test described above. The blocking property of the surface of a coating film after drying the coating film at 160° C. for 30 seconds was measured as per the following criteria.
A: Not sticky
F: Sticky
<Adhesiveness of Coating Film>
The olefin-based coating material was applied on PET and PP by the same method as the assessment of coating property described above. The adhesiveness of a coating film after drying for 30 seconds at 160° C. with the base materials PET and PP was measured based on the following criteria.
A: The coating film does not break away, and is adhered to PET and PP.
F: The coating film easily breaks away.

Example 2

The procedures in Example 1 were repeated to obtain and evaluate the olefin-based coating material, except that propylene-1-butene copolymer (b) was replaced with propylene-1-butene copolymer (c). The results are shown in Table 2.

Example 3

The procedures in Example 1 were repeated to obtain and evaluate the olefin-based coating material, except that propylene-1-butene copolymer (b) was replaced with propylene-1-butene copolymer (d). The results are shown in Table 2.

Example 4

The procedures in Example 1 were repeated to obtain and evaluate the olefin-based coating material, except that toluene (SP value 8.8 $(cal/cm^3)^{1/2}$) was used as an organic solvent. The results are shown in Table 2.

Example 5

The procedures in Example 4 were repeated to obtain and evaluate the olefin-based coating material, except that propylene-1-butene copolymer (b) was replaced with propylene-1-butene copolymer (c). The results are shown in Table 2.

Example 6

The procedures in Example 4 were repeated to obtain and evaluate the olefin-based coating material, except that propylene-1-butene copolymer (b) was replaced with propylene-1-butene copolymer (d). The results are shown in Table 2.

Example 7

The procedures in Example 1 were repeated to obtain and evaluate the olefin-based coating material, except that 70 g of methylcyclohexane and 30 g of propylene-1-butene copolymer (b) were used. The results are shown in Table 2. The viscosity was measured with the concentration of propylene-1-butene copolymer (b) being 30 mass %.

Example 8

The procedures in Example 7 were repeated to obtain and evaluate the olefin-based coating material, except that propylene-1-butene copolymer (b) was replaced with propylene-1-butene copolymer (c). The results are shown in Table 2. The viscosity was measured with the concentration of propylene-1-buten copolymer (C) being 30 mass %.

Example 9

The procedures in Example 7 were repeated to obtain and evaluate the olefin-based coating material, except that propylene-1-butene copolymer (b) was replaced with propylene-1-butene copolymer (d). The results are shown in Table 2. The viscosity was measured with the concentration of propylene-1-butene copolymer (d) being 30 mass %.

Example 10

The procedures in Example 2 were repeated to obtain and evaluate the olefin-based coating material, except that ethyl acetate (SP value 9.1 $(cal/cm^3)^{1/2}$) was used as an organic solvent. The results are shown in Table 2.

Example 11

The procedures in Example 2 were repeated to obtain and evaluate the olefin-based coating material, except that isopropyl alcohol (SP value 11.9 $(cal/cm^3)^{1/2}$) was used as an organic solvent. The results are shown in Table 2.

Example 12

The procedures in Example 11 were repeated to obtain and evaluate the olefin-based coating material, except that propylene-1-butene copolymer (b) was replaced with propylene-1-butene copolymer (e). The results are shown in Table 2.

Comparative Example 1

The procedures in Example 1 were repeated to obtain and evaluate the olefin-based coating material, except that propylene-1-butene copolymer (b) was replaced with propylene-1-butene copolymer (a). The results are shown in Table 3.

Comparative Example 2

The procedures in Example 1 were repeated to obtain and evaluate the olefin-based coating material, except that propylene-1-butene copolymer (b) was replaced with PP wax (NP055, manufactured by Mitsui Chemicals, Inc.). The results are shown in Table 3.

Comparative Example 3

The procedures in Example 4 were repeated to obtain and evaluate the olefin-based coating material, except that propylene-1-butene copolymer (b) was replaced with propylene-1-butene copolymer (a). The results of solubility and stability in a stationary state are shown in Table 3, but viscosity, coating property, blocking resistance and adhesiveness of a coating film could not be evaluated since the coating material was gelated at room temperature.

Comparative Example 4

The procedures in Example 4 were repeated to obtain and evaluate the olefin-based coating material, except that propylene-1-butene copolymer (b) was replaced with PP wax. The results are shown in Table 3.

Comparative Example 5

The procedures in Example 7 were repeated to obtain and evaluate the olefin-based coating material, except that propylene-1-butene copolymer (b) was replaced with propylene-1-butene copolymer (a). The results of solubility and stability in a stationary state are shown in Table 3, but viscosity, coating property, blocking resistance and adhesiveness of a coating film could not be evaluated since the coating material was gelated at room temperature.

Comparative Example 6

The procedures in Example 7 were repeated to obtain and evaluate the olefin-based coating material, except that propylene-1-butene copolymer (b) was replaced with PP wax. The results of solubility and stability in a stationary state are shown in Table 3, but viscosity, coating property, blocking resistance and adhesiveness of a coating film could not be evaluated since the coating material turned into slurry at room temperature, and became high in viscosity.

Comparative Example 7

The procedures in Example 10 were repeated to obtain and evaluate the olefin-based coating material, except that propylene-1-butene copolymer (c) was replaced with propylene-1-butene copolymer (a). The results of solubility are shown in Table 3, but viscosity, stability in a stationary state, coating property, blocking resistance and adhesiveness of a coating film could not be evaluated since propylene-1-butene copolymer (a) did not dissolve in ethyl acetate.

Comparative Example 8

The procedures in Example 10 were repeated to obtain and evaluate the olefin-based coating material, except that propylene-1-butene copolymer (c) was replaced with PP wax. The results are shown in Table 3.

Comparative Example 9

The procedures in Example 1 were repeated to obtain and evaluate the olefin-based coating material, except that 30 g of methylcyclohexane and 70 g of propylene-1-butene copolymer (c) were used. The results of solubility and stability in a stationary state are shown in Table 3, but coating property, blocking resistance and adhesiveness of a coating film could not be evaluated since viscosity exceeded 10,000 mPa·s. The viscosity was measured with the concentration of propylene-1-butene copolymer (c) being 70 mass %.

TABLE 2

| | Proportion (mass ratio) | Example 1 | Example 2 | Example 3 | Example 4 | Example 5 | Example 6 | Example 7 | Example 8 | Example 9 | Example 10 | Example 11 | Example 12 |
|---|---|---|---|---|---|---|---|---|---|---|---|---|---|
| Organic solvent | Methylcyclohexane | 90 | 90 | 90 | | | | 70 | 70 | 70 | | | |
| | Toluene | | | | 90 | 90 | 90 | | | | | | |
| | Ethyl acetate | | | | | | | | | | 90 | | |
| | Isopropyl alcohol | | | | | | | | | | | 90 | 90 |
| Propylene 1-butene copolymr | a | | | | | | | | | | | | |
| | b | 10 | | | 10 | | | 30 | | | | | |
| | c | | 10 | | | 10 | | | 30 | | 10 | 10 | |
| | d | | | 10 | | | 10 | | | 30 | | | |
| | e | | | | | | | | | | | | 10 |
| | PP wax | | | | | | | | | | | | |
| Solubility | Room temperature | A | A | A | B | B | B | A | A | A | C | C | C |
| | 40° C. | A | A | A | A | A | A | A | A | A | C | C | A |
| | 50° C. | A | A | A | A | A | A | A | A | A | C | C | A |
| Viscosity of the coating material (mPa·s) | Room temperature (23° C.) | 5 | 3 | 2 | 8 | 6 | 4 | 19 | 5 | 3 | 1 | 2 | 3 |
| Stability in a stationary state | Room temperature | A | A | A | A | A | A | A | A | A | B | B | A |
| Coating property | PET dried at room temperature | A | A | A | B | B | B | B | B | B | C | C | B |
| | PET dried at 160° C. × 30 seconds | A | A | A | B | B | B | B | B | B | B | B | B |
| | PP dried at room temperature | A | A | A | B | B | B | B | B | B | C | C | B |
| | PP dried at 160° C. × 30 seconds | A | A | A | B | B | B | B | B | B | B | B | B |
| Blocking resistance | Dried at 160° C. × 30 seconds | A | A | A | A | A | A | A | A | A | A | A | A |

TABLE 2-continued

| Proportion (mass ratio) | | Example 1 | Example 2 | Example 3 | Example 4 | Example 5 | Example 6 | Example 7 | Example 8 | Example 9 | Example 10 | Example 11 | Example 12 |
|---|---|---|---|---|---|---|---|---|---|---|---|---|---|
| Adhesiveness of a coating film | PET dried at 160° C. × 30 seconds | A | A | A | A | A | A | A | A | A | A | A | A |
| | PP dried at 160° C. × 30 seconds | A | A | A | A | A | A | A | A | A | A | A | A |

TABLE 3

| Proportion (mass ratio) | | Comp. Example 1 | Comp. Example 2 | Comp. Example 3 | Comp. Example 4 | Comp. Example 5 | Comp. Example 6 | Comp. Example 7 | Comp. Example 8 | Comp. Example 9 |
|---|---|---|---|---|---|---|---|---|---|---|
| Organic solvent | Methylcyclohexane | 90 | 90 | | | 70 | 70 | | | 30 |
| | Toluene | | | 90 | 90 | | | | | |
| | Ethyl acetate | | | | | | | 90 | 90 | |
| | Isopropyl alcohol | | | | | | | | | |
| Propylene 1-butene copolymer | a | 10 | | 10 | | 30 | | 10 | | |
| | b | | | | | | | | | |
| | c | | | | | | | | | 70 |
| | d | | | | | | | | | |
| | PP wax | | 10 | | 10 | | 30 | | 10 | |
| Solubility | Room temperature | B | C | F | C | F | F | F | C | F |
| | 40° C. | B | C | F | C | F | F | F | C | F |
| | 50° C. | B | C | B | C | F | F | F | C | F |
| Viscosity of the coating material (mPa · s) | Room temperature (23° C.) | 510 | 1 | — | 3 | — | — | — | 3 | >10000 |
| Stability in a stationary state | Room temperature | A | B | F | B | F | F | Insoluble | B | F |
| Coating property | PET dried at room temperature | A | F | — | F | — | — | — | F | — |
| | PET dried at 160° C. × 30 seconds | A | F | — | F | — | — | — | F | — |
| | PP dried at room temperature | A | F | — | F | — | — | — | F | — |
| | PP dried at 160° C. × 30 seconds | A | F | — | F | — | — | — | F | — |
| Blocking resistance | Dried at 160° C. × 30 seconds | B | A | — | A | — | — | — | A | — |
| Adhesiveness of a coating film | Dried at 160° C. × 30 seconds | A | F | — | F | — | — | — | F | — |
| Adhesiveness of a coating film | PET dried at 160° C. × 30 seconds | A | F | — | F | — | — | — | F | — |
| | PP dried at 160° C. × 30 seconds | A | F | — | F | — | — | — | F | — |

As shown in Tables 2 and 3, the olefin-based coating materials (Examples 1 to 12) of which (i) the weight-average molecular weight (Mw) is within the range of 3,000 to 40,000, and (ii) which contain 60 to 90 mol % of structural units (a) derived from propylene and 10 to 40 mol % of structural units (b) derived from α-olefins having 4 or more carbon atoms, showed excellent stability in a stationary state, coating property and blocking resistance.

In contrast, the olefin-based coating materials which contained α-olefin copolymer with large weight-average molecular weight showed low blocking resistance (for example, Comparative Example 1) and low solubility in organic solvent, and thus, could not be used as a coating material (Comparative Example 3, 5 and 7). Moreover, the polypropylene wax had poor solubility in organic solvent, and even when it was dissolved, its coating property or adhesiveness of a coating film to substrate was low (Comparative Example 2, 4, 6 and 8). Even when propylene-α-olefin copolymer was included, when it was contained in an excessive amount, the viscosity was immoderately high and thus, could not be painted (Comparative 9).

Example 13

<Preparation of Polar Monomer Graft Crosslinked Resin>
Synthesis of Propylene-Based Elastomer A thoroughly nitrogen purged 2 L autoclave was loaded with 900 ml of hexane and 85 g of 1-butene, and 1 mmol of triisobutylaluminum was added thereto, followed by heating to 70° C. Propylene was supplied into the autoclave, with the overall pressure of 7 kg/cm$^2$G. To this, 0.30 mmol of methylaluminoxane and 0.001 mmol (in terms of Zr atom) of rac-dimethylsilylene-bis{1-(2-methyl-4-phenylindenyl)} zirconium dichloride were added, to which propylene was continuously supplied to maintain the overall pressure at 7 kg/cm$^2$G, and polymerization was performed for 30 minutes. Once the polymerization reaction was quenched, exhaustion was carried out and polymers were collected in a bulk of methanol. The obtained polymers were dried under reduced pressure at 110° C. for 12 hours, thereby producing propylene-based elastomer of Mw 240,000 and Tm 91° C.

Subsequently, 1.0 part by mass of polar monomer (maleic anhydride) and 0.2 parts by mass of radical polymerization initiator (Perhexyne 25B) were added to 50 parts by mass of the above-described propylene-based elastomer (synthetic) and 50 parts by mass of styrene-based elastomer (Tuftec H1051, Asahi Kasei Corporation SEBS, content of styrene: 40 parts by mass, Mw: 72,000). The mixture was thoroughly mixed, and a twin-screw extruder (manufactured by Nippon Placon Co., Ltd.; 30 mm extruder, L/D=42, rotate in one direction, 2 vents installed, vent pressure reduced to 0.08 MPa, extrusion amount: 16 kg/Hr.) was used to perform modification through extrusion, and thus, polar monomer graft crosslinked resin was obtained.

<Adjustment of Olefin-Based Coating Material>

57 g of polar monomer graft crosslinked resin obtained above and 3 g of propylene-1-butene copolymer (c) used in Example 2 were dissolved in 240 g of methylcyclohexane at the same time, thereby producing olefin-based coating material having a solid content of 20%.

<Evaluation of the Coating Material>

The stability, coating property, blocking resistance and adhesiveness of a coating film of the coating material were assessed according to the evaluation criteria hereinbelow. The results are shown in Table 4.

<Stability in a Stationary State>

The stability of the coating material was assessed after one week of keeping in a stationary state.

A: No separation in the coating material

B: Partial separation in the coating material, but is easily re-dispersed

F: Components of the coating material are separated

<Coating Property>

The olefin-based coating material was applied onto an aluminum foil using a bar coater at a thickness of 2 μm/dry, and was air dried. Then, it was heated for 20 seconds in an air-oven set at 170° C. to obtain a coated foil. The exterior was evaluated based on the following criteria.

A: The coating film was even.

F: The coating film had streaks and unevenness.

<Blocking Resistance>

On a coated foil produced in the same method used for coating property above, more aluminum foils were placed, and 1 kgf load was applied at 60° C. for 24 hours. It was then cooled to room temperature, after which the detachability of the mounted aluminum foil and the coating film were evaluated.

A: Detachment of the aluminum foil and the coating film was very good.

B: Detachment of the aluminum foil and the coating film was good.

C: Some parts between the aluminum foil and the coating film were poorly detached.

F: The aluminum foil was adhered to the coating film, so they could not be detached from each other.

Example 14

The procedures in Example 13 were repeated to obtain and evaluate the olefin-based coating material, except that 48 g of polar monomer graft crosslinked resin and 12 g of propylene-1-butene copolymer (c) were used. The results are shown in Table 4.

Comparative Example 10

The procedures in Example 13 were repeated to obtain and evaluate the olefin-based coating material, except that 60 g of polar monomer graft crosslinked resin was used and propylene-1-butene copolymer (c) was not used. The results are shown in Table 4.

Comparative Example 11

The procedures in Example 13 were repeated to obtain and evaluate the olefin-based coating material, except that propylene-1-butene copolymer (c) was replaced with propylene-1-butene copolymer (a). The results are shown in Table 4.

TABLE 4

| Proportion (mass ratio) | Example 13 | Example 14 | Comp. Example 10 | Comp. Example 11 |
|---|---|---|---|---|
| Polar monomer graft crosslinked resin | 95 | 80 | 100 | 95 |
| Propylene-1-butene copolymer a | 0 | 0 | 0 | 5 |
| Propylene-1-butene copolymer c | 5 | 20 | 0 | 0 |
| Stability in a stationary state | B | A | F | F |
| Coating property | A | A | F | F |
| Blocking resistance | B | A | F | F |

As shown in Table 4, the propylene-α-olefin copolymer of which (i) the weight-average molecular weight (Mw) is within the range of 3,000 to 40,000, and which (ii) contains 60 to 90 mol % of structural units (a) derived from propylene and 10 to 40 mol % of structural units (b) derived from α-olefins having 4 or more carbon atoms, and the olefin-based coating material containing other resins (Example 13 and 14), showed excellent stability in a stationary state, coating property and blocking resistance.

In contrast, the olefin-based coating material which did not contain the propylene-α-olefin copolymer showed lower stability in a stationary state, and poor coating property and blocking resistance (Comparative Example 10). Also, even when the propylene-α-olefin copolymer was included, when its weight-average molecular weight (Mw) was excessively high, the stability in a stationary state was low, and coating property and blocking resistance were poor (Comparative Example 11).

INDUSTRIAL APPLICABILITY

As aforementioned, the olefin-based coating material of the present invention has no stickiness on the surface of a coating film when coated, and thus, shows excellent adhesiveness to various molded articles. Therefore, it can be applied to coating material, primer and adhesive for plastic, metal, paper, wood, fiber, leather, glass, rubber, ceramic and concrete or to binder for ink, and is used in various industrial material fields and construction material fields. Furthermore, the olefin-based coating material of the invention may be applied to filler dispersants and pigment dispersants of various compositions for coating; and to binders for ceramic and metallurgic formulation.

The invention claimed is:

1. An olefin-based coating material comprising a solution or dispersion in which 0.1 to 55 parts by mass of a propylene-α-olefin copolymer (A) which satisfies the following requirements (i) to (iii) is dissolved or dispersed in 100 parts by mass of an organic solvent:

(i) a weight-average molecular weight (Mw) measured by gel permeation chromatography (GPC) is in the range of 3,000 to 40,000;

(ii) the propylene-α-olefin copolymer (A) contains propylene-derived structural units (a) in the range of 60 to 90 mol %, and structural units (b) derived from α-olefin having not less than 4 carbon atoms in the range of 10 to 40 mol % (wherein (a)+(b)=100 mol %); and
(iii) the number of vinylidene groups per 1,000 carbon atoms is 0.5 to 5 as measured by $^1$H-NMR;
wherein the propylene-α-olefin copolymer (A) is obtained through thermal decomposition of a propylene-α-olefin copolymer (A-1) which satisfies the following requirements (a) to (c):
(a) a weight-average molecular weight (Mw), measured by GPC is in the range of 50,000 to 1,000,000;
(b) a melting point (Tm) obtained from DSC is in the range of 60 to 120° C.; and
(c) a half-width of the melting peak obtained from DSC is in the range of 1 to 20° C.

2. The olefin-based coating material according to claim 1, wherein the propylene-α-olefin copolymer (A) further satisfies the following requirements (iv) and (v):
(iv) a half-width of crystal melting peak obtained from differential scanning calorimetry (DSC) is in the range of 1 to 20° C.; and
(v) a melting point (Tm) obtained from DSC is in the range of 60 to 110° C.

3. The olefin-based coating material according to claim 1, wherein the propylene-α-olefin copolymer (A) further satisfies the following requirement (vi):
(vi) a heat of fusion (ΔH) obtained from DSC is in the range of 40 to 100 J/g.

4. The olefin-based coating material according to claim 1, wherein the propylene-α-olefin copolymer (A) is completely dissolved in the organic solvent at 50° C. or above.

5. The olefin-based coating material according to claim 1, wherein a 60 rotational viscosity at 23° C. measured by B-type viscometer is equal to or less than 500 mPa-s when the concentration of the propylene-α-olefin copolymer (A) in the olefin-based coating material is 10 mass %.

6. The olefin-based coating material according to claim 1, wherein the organic solvent is at least one member selected from a hydrocarbon solvent, an alcohol solvent and an ester solvent.

7. The olefin-based coating material according to claim 1, wherein an SP value of the organic solvent is between 7.0 and 13.0.

8. An olefin-based coating material comprising a solution or dispersion in which a propylene-α-olefin copolymer (A) and other resin are dissolved or dispersed in an organic solvent, the propylene-α-olefin copolymer (A) satisfies the following requirements (i) to (iii):
(i) a weight-average molecular weight (mw) measured by GPC is in the range of 3,000 to 40,000;
(ii) the propylene-α-olefin copolymer (A) contains propylene-derived structural units (a) in the range of 60 to 90 mol %, and structural units (b) derived from α-olefin having 4 or more carbon atoms in the range of 10 to 40 mol % (wherein (a)+(b)=100 mol %); and
(iii) the number of vinylidene groups per 1,000 carbon atoms is 0.5 to 5 as measured by $^1$H-NMR;
wherein the propylene-α-olefin copolymer (A) is obtained through thermal decomposition of a propylene-α-olefin copolymer (A-1) which satisfies the following requirements (a) to (c):
(a) a weight-average molecular weight (Mw) measured by GPC is in the range of 50,000 to 1,000,000;
(b) a melting point (Tm) obtained from DSC is in the range of 60 to 120° C.; and
(c) a half-width of the melting peak obtained from DSC is in the range of 1 to 20° C.

9. The olefin-based coating material according to claim 8, wherein the propylene-α-olefin copolymer (A) further satisfies the following requirements (iv) and (v):
(iv) a half-width of crystal melting peak obtained from differential scanning calorimetry (DSC) is in the range of 1 to 20° C.; and
(v) a melting point (Tm) obtained from DSC is in the range of 60 to 110° C.

10. The olefin-based coating material according to claim 8, wherein the propylene-α-olefin copolymer (A) further satisfies the following requirement (vi):
(vi) a heat of fusion (ΔH) obtained from DSC is in the range of 40 to 100 J/g.

* * * * *